United States Patent
Ruettiger et al.

(10) Patent No.: US 7,164,983 B2
(45) Date of Patent: Jan. 16, 2007

(54) SWITCHING DEVICE FOR DETECTING A VOLTAGE INTERRUPTION

(75) Inventors: Anton Ruettiger, Wildflecken (DE); Mario Schmitt, Salz (DE)

(73) Assignee: Preh GmbH, Bad Neustadt/Saale (DE)

( * ) Notice: Subject to any disclaimer, the term of this patent is extended or adjusted under 35 U.S.C. 154(b) by 0 days.

(21) Appl. No.: 11/401,335

(22) Filed: Apr. 11, 2006

(65) Prior Publication Data

US 2006/0202727 A1    Sep. 14, 2006

Related U.S. Application Data

(63) Continuation of application No. PCT/EP04/11209, filed on Oct. 7, 2004.

(30) Foreign Application Priority Data

Oct. 11, 2003  (DE) ................. 103 47 359

(51) Int. Cl.
    *G05B 23/02*   (2006.01)
    *G01F 17/00*   (2006.01)
(52) U.S. Cl. ..................................... 701/114
(58) Field of Classification Search ................ 701/114, 701/102, 115, 1; 327/143
    See application file for complete search history.

(56) References Cited

U.S. PATENT DOCUMENTS

| | | | | |
|---|---|---|---|---|
| 4,293,811 A | * | 10/1981 | Muto et al. | 322/60 |
| 4,469,957 A | | 9/1984 | Krueger et al. | |
| 4,580,221 A | * | 4/1986 | Isobe et al. | 701/114 |
| 5,079,716 A | * | 1/1992 | Lenhardt et al. | 701/1 |

FOREIGN PATENT DOCUMENTS

| | | |
|---|---|---|
| DE | 3829405 | 3/1990 |
| DE | 19726752 | 1/1999 |
| EP | 0458303 | 11/1991 |

* cited by examiner

*Primary Examiner*—Hieu T. Vo
(74) *Attorney, Agent, or Firm*—McGrath, Geissler, Olds & Richardson, PLLC

(57) ABSTRACT

A switching device for detecting a voltage interruption at a control unit in a motor vehicle, with a nonvolatile memory for storage of calibration data for an actuator that can be adjusted by the control unit and a drive unit. The control unit is supplied with an internal voltage through a voltage regulator and a bistable multivibrator is connected ahead of the voltage regulator in the external voltage supply of the control unit, and, whereby a microcomputer is connected with the multivibrator and is integrated in the control unit.

6 Claims, 2 Drawing Sheets

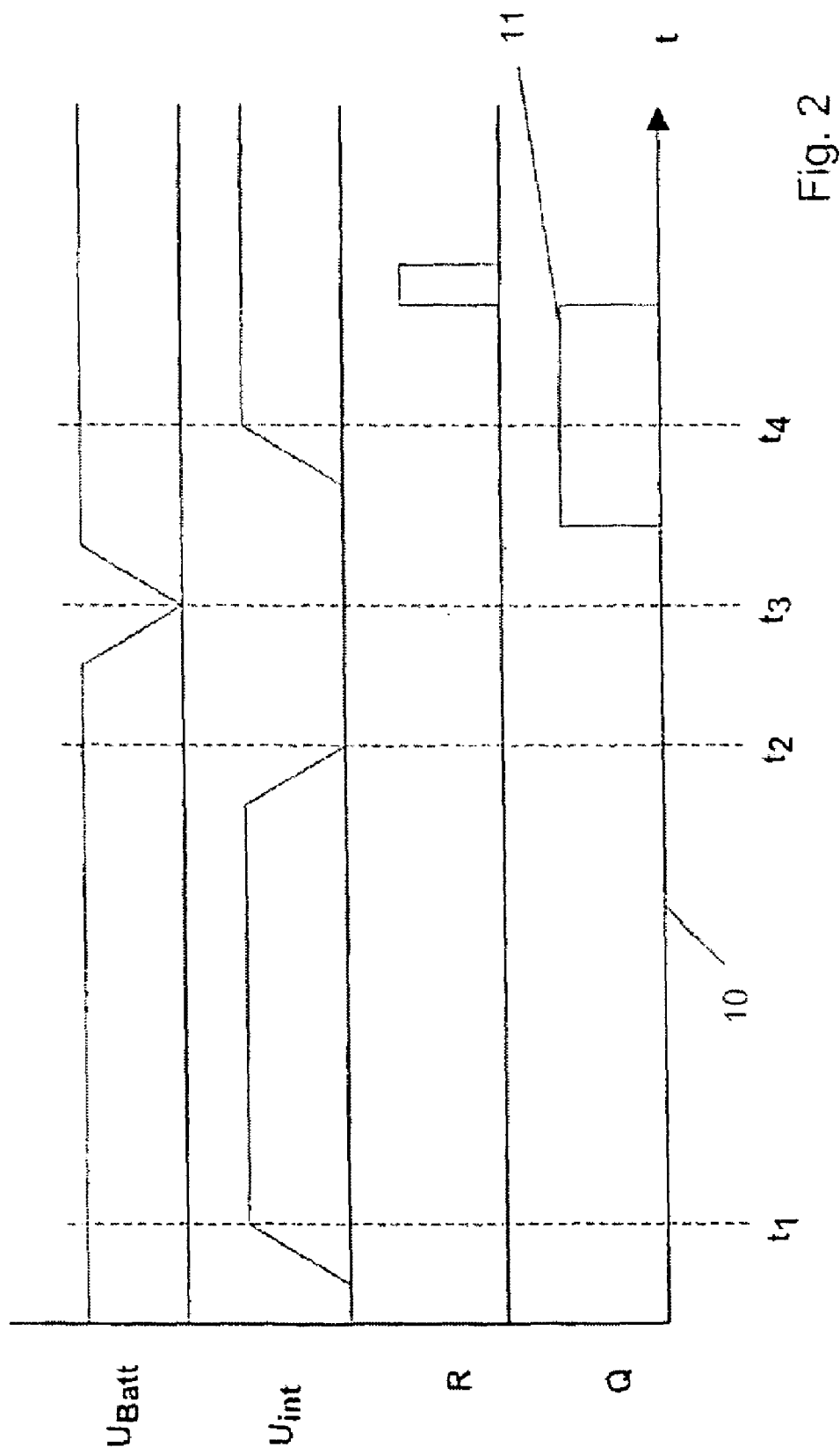

SWITCHING DEVICE FOR DETECTING A VOLTAGE INTERRUPTION

This nonprovisional application is a continuation of PCT/EP2004/011209, which was filed on Oct. 7, 2004, and which claims priority to German Patent Application No. DE 103 47 359, which was filed in Germany on Oct. 11, 2003, and which are both herein incorporated by reference.

BACKGROUND OF THE INVENTION

1. Field of the Invention

The present invention relates to a switching device for detecting a voltage interruption at a control unit in a motor vehicle with a nonvolatile memory for storage of calibration data for an actuator that can be adjusted by the control unit and a drive unit. The invention further relates to a method for automatic recalibration of a control unit for a drive unit of an actuator following an interruption of an external voltage supply wherein the actuator is moved by the drive unit to a defined position for calibration and wherein the calibration data are subsequently adjusted using the actual position detected and are stored in a nonvolatile memory.

2. Description of the Background Art

Electric motor drive units are increasingly used for moving actuators in motor vehicles. The drive units here are controlled or regulated through signal processing arrangements. DE 38 29 405 A1 illustrates a signal processing arrangement that detects discrete signals of a rotation sensor located in the electric motor. Each of the signals corresponds to a small constant travel of an actuator that is driven by the drive unit. The actual position of the actuator is determined from these sensor signals in conjunction with a direction of rotation of the electric motor. In this context, the drive unit and the signal processing arrangement are typically connected to an electrical system of the motor vehicle through a common power supply line. However, if the voltage supply to the electrical system is interrupted, data stored in the drive unit or signal processing arrangement are lost. As a result, actual positions of the actuators are no longer known once the voltage supply is restored. Thus, position regulation or control by the signal processing arrangement is no longer possible at first.

So that the actual positions of the actuators are not lost, DE 197 26 752 A1 discloses a method for operating an electric motor drive unit in which interruptions of the supply voltage are detected and appropriate measures are initiated to keep the actual positions from being lost. This patent document describes a method for operating an electric motor drive unit that is integrated in at least one circuit with a signal processing arrangement for controlling or regulating the electric motor and with a switch through which the interruptions or contact disruptions of the circuit are detected and communicated to the signal processing arrangement, whereby interruptions or contact disruptions are detected by sensing the current flowing in the circuit. In the event that an interruption in the supply voltage is detected, the actual position of the actuator is determined by analyzing the rotation signals of the electric motor's armature shaft. To this end, two Hall sensors are installed at the end of the motor armature shaft, and emit a signal that is appropriately proportional to the rotation of the motor armature shaft. The Hall sensor signals are incremented or decremented as a function of the direction of rotation in another nonvolatile memory of the signal processing arrangement. A summation of the increments or decrements represents an absolute actual position of the actuator. Thus, the signal processing arrangement can then be without a voltage supply, for example, when the vehicle battery or the drive unit is replaced in the event of maintenance work on the motor vehicle.

SUMMARY OF THE INVENTION

It is therefore an object of the present invention to provide a switching device for detecting a voltage interruption in an external voltage supply that facilitates automatic recalibration of a control unit and that is also simple in design and economical to realize. A further object of the invention is to provide a method that detects a voltage interruption and that initiates automatic recalibration of a control unit.

In an embodiment of the present invention, a control unit is supplied with an internal voltage through a voltage regulator, a bistable multivibrator is connected ahead of the voltage regulator in the external voltage supply of the control unit, and a microcomputer is electrically connected with the multivibrator is integrated in the control unit. With regard to method, the object is attained in that there is integrated in the external voltage supply a bistable multivibrator that changes its output state when the external voltage supply is turned on, so that once the internal voltage supply for the control unit is switched on it is possible to determine whether an interruption of the external supply voltage has occurred by interrogating an output state of the multivibrator. Due to the inventive design of the switching device, it is possible to detect a voltage interruption in an external supply voltage and perform recalibration of drive units of actuators by the control unit. It can also be determined whether the external voltage supply has been interrupted. Since a determination regarding the interruption of the external voltage supply can be made through an output state of the multivibrator, the switching device operates automatically and can thus perform a calibration of the control unit without the need for the switching device to be initialized from the outside.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 is a timing diagram of a time behavior for detecting a voltage interruption according to an embodiment of the present invention.

DETAILED DESCRIPTION

Figure 1:
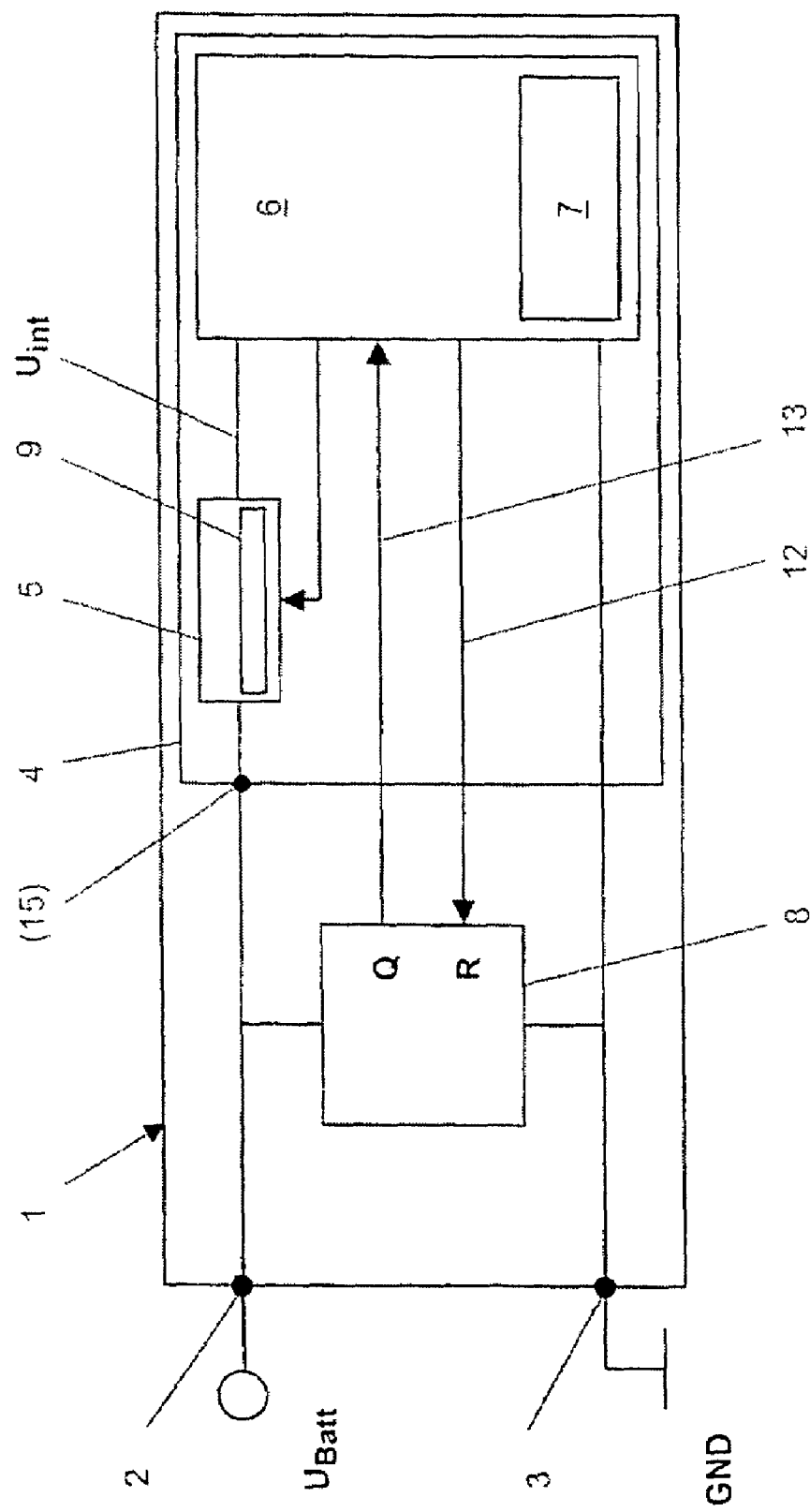
FIG. 1 is a block diagram of a switching device for detecting a voltage interruption according to an embodiment of the present invention.

FIG. 1 shows a switching device 1, which is connected through a terminal 2 with an external voltage source UBatt. The switching device 1 is connected to the ground GND, for example, a body of a motor vehicle, through the terminal 3. A control unit 4 includes a voltage regulator 5 and a microcomputer 6, which is equipped with a nonvolatile memory 7. A bistable multivibrator 8 is electrically connected to the terminals 2, 3 and connected upstream of the control unit 4. The voltage regulator 5 additionally contains an exclusion element 9.

The control unit 4 controls or regulates a drive unit of an adjustable actuator. This actuator could be, for example, a ventilation flap in an air conditioner, but could also be an electric motor for driving a powered window, for instance. The drive unit is typically an electric motor or an electric motor equipped with a gearbox, which can be equipped, for example, with an incremental position measuring system. So that the control unit 4 can calculate the corresponding movements of the actuators or the number of rotations of the electric motors, the actuator should first be moved to a defined position where the actual position of the motor is then determined and stored in the nonvolatile memory 7 of the microcomputer 6. This calibration procedure for determining the actual position of the drive unit is necessary in order to be able to execute a predefinable motion of the actuator starting from this position. The nonvolatile memory 7 in which the actual position of the calibration procedure is stored can be an EEPROM, for example. These electrically erasable memories have the advantage that the memory can be rewritten in the event of recalibration.

In the normal case, the external supply voltage UBatt is present at the terminals 2, 3 of the switching device 1. Now if the control unit 4 is incorporated into the electronics of the motor vehicle through a terminal 15, then voltage is only present at the voltage regulator 5 when the motor vehicle's ignition is turned on. The voltage regulator 5 has the task of supplying the microcomputer 6 with a constant voltage, which may be 5 volts, for example, so that the microcomputer 6 is decoupled from the widely varying voltages of the external supply voltage UBatt. An exclusion element 9 is integrated in the voltage regulator 5. The purpose of the exclusion element is to ensure that the microcomputer 6 is not immediately powered down after the ignition is switched off, so that necessary operations for shutting down the microcomputer 6 can be carried out first. After the ignition current is switched on, which is to say that a voltage is applied to the terminal 15, an internal supply voltage Uint is applied to the microcomputer 6 via the voltage regulator 5. The microcomputer 6 now tests whether the output state Q of the bistable multivibrator 8 is at "high" or "low." If the output state is at "low," no calibration procedure is initiated, since the external supply voltage UBatt was not interrupted. If the control unit is disconnected from the external supply voltage UBatt, for example as part of an inspection or replacement of the drive unit for the control unit, the established low-state of the multivibrator is lost upon reconnection of the external supply voltage UBatt. As a result of the asymmetric structure of the multivibrator 8, the output Q is switched to "high." Once the internal supply voltage Uint is switched on, the output state Q of the multivibrator is again tested. Since the multivibrator 8 is in the high state, the microcomputer 6 knows that the switching device 1 was disconnected from the external supply voltage UBatt during the intervening time period. In this case, the recalibration procedure is initiated. The bistable multivibrator 8 can be a flip-flop.

FIG. 2 illustrates a timing diagram with reference to applied voltages and states to show a process sequence for initializing automatic recalibration of a control unit 1. The bottom line of the diagram shows the output state Q as "low" 10 or "high" 11. The second line shows a pulse R for resetting the output state Q of the multivibrator 8. The voltage curve of the internal supply voltage Uint is plotted in the third line from the bottom in the diagram. The top line represents the voltage curve of the external supply voltage UBatt.

At the time T1, the switching device 1 is in a state of normal operation of the motor vehicle. The supply voltage UBatt is connected to the switching device 1 and the ignition of the motor vehicle has been started; the vehicle is running and the terminal 15 is supplied with voltage. A voltage Uint is applied to the microcomputer 6 here. Since the output state Q of the multivibrator 8 is switched to "low" 10, recalibration of the actual values of the drive unit is not necessary. At the time T2, the internal supply voltage Uint is switched off. The vehicle is no longer operating. At the time T3, the external supply voltage UBatt is disconnected from the switching device 1. This has the consequence that once the external supply voltage UBatt is switched on, the bistable multivibrator 8 toggles and is now in the state "high" 11. After a subsequent ignition or application of the internal supply voltage Uint, the output state Q is interrogated by the microcomputer 6. The output state Q at the time T4 is "high" 11. The microcomputer 6 now initiates the recalibration procedure for the drive unit for the actuator. The actual data that are read are stored in the nonvolatile memory 7, which is to say that the actual position of the drive unit is stored in the EEPROM 7. Starting from this defined position, and via the stored data of the actual position, the actuator can be moved to any desired possible position. In a subsequent step, the output state Q of the multivibrator 8 is toggled once again by line 12, shown in FIG. 1, so that the output state Q is once again at "low" 10. Here, the microcomputer stands is electrically connected with the multivibrator 8 by the line 13 in order to interrogate the output state Q.

As a result of the use of a bistable flip-flop 8, a simple and economical switching device 1 is implemented in accordance with the invention, permitting automatic recalibration of a control unit 4 for a drive unit of an actuator following an interruption of an external voltage supply UBatt.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A switching device for detecting a voltage interruption, the switching device comprising:
   a control unit being provided in a motor vehicle, the control unit including a nonvolatile memory for storing calibration data for an actuator that is adjusted by the control unit and a drive unit, the control unit being supplied with an internal voltage through a voltage regulator;
   a bistable multivibrator being electrically connected upstream of the voltage regulator in an external voltage supply of the control unit, the bistable multivibrator being switchable on the basis of a voltage detection; and
   a microcomputer being integrated in the control unit and being electrically connected with the multivibrator such that an output state of the bistable multivibrator is changeable after a calibration procedure.

2. The switching device according to claim 1, wherein the voltage regulator includes an exclusion element, and wherein the microcomputer is electrically connected with the voltage regulator so that a self-latching circuit is formed.

3. A method for automatic recalibration of a control unit for a drive unit of an actuator, the method comprising the steps of:
- detecting an interruption of an external voltage supply;
- actuating the actuator by the drive unit to a defined position for calibration upon detection of the interruption of the external voltage supply;
- adjusting calibration data via an actual position detected; and
- storing the calibration data in a nonvolatile memory,
- wherein the external voltage supply precedes a bistable multivibrator that changes its voltage state when the external voltage supply is switched on, so that when an internal voltage supply for the control unit has been switched on, an interruption in the external supply voltage can be detected by determining an output state of the multivibrator, and
- wherein the output state of the multivibrator is changeable by a microcomputer.

4. The method according to claim 3, wherein a recalibration procedure is initiated as a function of the output state of the multivibrator after the internal supply voltage has been switched on.

5. The method according to claim 4, wherein, after the recalibration procedure, the voltage state of the multivibrator is changed by the microcomputer that is integrated in the control unit.

6. The method according to claim 3, wherein the output state of the multivibrator is changed to a low state after a recalibration procedure and to a high state when the external supply voltage is switched on.

* * * * *